United States Patent [19]

Clark et al.

[11] Patent Number: 4,832,462
[45] Date of Patent: May 23, 1989

[54] LIQUID CRYSTAL DEVICES

[75] Inventors: Michael G. Clark, Gerrards Cross; Alan Mosley, Berkhamsted; Carolyn Bowry, London Colney; Beatrice M. Nicholas, Tring, all of England

[73] Assignee: The General Electric Company, p.l.c., England

[21] Appl. No.: 62,159

[22] Filed: Jun. 12, 1987

[30] Foreign Application Priority Data

Jun. 18, 1986 [GB] United Kingdom ............... 8614838

[51] Int. Cl.$^4$ .............................................. G02F 1/13
[52] U.S. Cl. ........................... 350/350 S; 350/347 E; 350/341
[58] Field of Search ............... 350/347 E, 341, 350 S

[56] References Cited

U.S. PATENT DOCUMENTS

| 4,461,715 | 7/1984 | Lu et al. ............................... 350/351 |
| 4,563,059 | 1/1986 | Clark et al. ........................... 350/330 |
| 4,582,396 | 4/1986 | Bos et al. .......................... 350/347 E |
| 4,721,367 | 1/1988 | Yoshinaga et al. .............. 350/350 S |
| 4,778,259 | 10/1988 | Kitayama et al. ................... 350/341 |

FOREIGN PATENT DOCUMENTS 0219479 4/1987 European Pat. Off. .
0241962 1/1987 German Democratic Rep. .

OTHER PUBLICATIONS

Conference Record of the 1985 International Display Research Conference (S. T. Lagerwall et al.), "Ferroelectric Liquid Crystals for Displays", pp. 213-221.

Primary Examiner—Stanley D. Miller
Assistant Examiner—Anita E. Pellman
Attorney, Agent, or Firm—Kirschstein, Ottinger, Israel & Schiffmiller

[57] ABSTRACT

A liquid crystal device comprises a ferroelectric smectic phase liquid crystal enclosed between two surfaces, the surfaces being such that the directors of the liquid crystal adjacent the surfaces are not parallel to the surfaces. The directors adjacent one of the surfaces are not parallel to the directors adjacent the other surface, the liquid crystal cone angle being equal to half the angle between a pair of directors each adjacent a different one of the surfaces.

5 Claims, 2 Drawing Sheets

LIQUID CRYSTAL DEVICES

BACKGROUND OF THE INVENTION

1. Field of the Invention

This invention relates to liquid crystal devices. In particular the invention relates to liquid crystal devices incorporating ferroelectric liquid crystals, such devices having the advantage over devices using non-ferroelectric liquid crystals in that the interaction between a ferroelectric liquid crystal and an external electric field causing the device to switch is linear.

2. Description of the Related Art

In a paper by N. A. Clark and S. T. Lagerwall published in Applied Physics Letters, Volume 36, pages 899–901 in June 1980 there is described an example of a known liquid crystal device incorporating a ferroelectric liquid crystal.

FIG. 1 is a schematic diagram of the prior art device described in this paper; and FIGS. 2 to 5 illustrate various polarisation states of prior art device shown in FIG. 1.

Referring to FIG. 1 the device comprises two parallel glass plates 1, 3 enclosing a chiral smectic C phase (C*) liquid crystal 5, the spacing between the plates being less than the distance at which the liquid crystal helix forms in the absence of an electric field. The planes of constant number density of molecules i.e. the smectic layers 7 are chosen to be perpendicular to the plates 1, 3, the internal surfaces of the plates being treated in such a way that the average direction of the molecules of the liquid crystal, i.e. the directors, lie in planes parallel to those of the plates 1, 3. For sufficiently small interplate spacings, these conditions cause the liquid crystal helix to unwind, the liquid crystal having two alternative equal energy configurations corresponding to two different director orientations within each of the planes parallel to the plates through the crystal. These are shown as arrows 9, 11 in FIG. 1, and correspond to the intersection of the cone of angle $\theta_s$, where $\theta_s$ is the liquid crystal tilt angle or "cone angle", i.e. the angle between the director and the normal to the smectic layers, with the plane in which the directors lie.

Referring now also to FIGS. 2 and 3, the two different director orientations 9, 11 give rise to respective antiparallel ferroelectric domains of spontaneous polarisation, the directions of the polarisation $P_s$ being tangential to the base of the cone. The polarisation of these domains will thus be normal to the plates 1, 3 the polarisation states shown in FIG. 2 arising from directors parallel to 9 being designated "UP" polarisations, and those shown in FIG. 3 arising from directors parallel to 11 and being designated "DOWN" polarisations. The device may be switched between these polarisation states by application of an electric field between the plates 1, 3.

The device as hereinbefore described suffers from the problem, however, that it is difficult to obtain the director alignment in which the directors are held in planes parallel to the confining plates, whilst still allowing rotation of the directors in these planes between their two allowed orientations. Furthermore, as discussed by S.T. Lagerwall and J. Wahl in the Proceedings of the 1985 International Display Research Conference, pages 213–221, unless the spacing between the plates 1, 3 is kept very small, typically less than 2 μm, further so-called "SPLAY" polarisation states of the forms indicated in FIGS. 4 and 5 are created, these states being energetically favoured for thick liquid crystals. Furthermore, in both the "UP" and "DOWN" states $P_s$ points into one plate 1 or 3 and away from the other plate 3 or 1, whereas in the two "SPLAY" states $P_s$ adjacent the plates 1, 3 may point into both plates or away from both plates. Thus if the plates 1, 3 and any coatings thereon impart some preference concerning whether $P_s$ should point towards or away from the plates 1, 3 then the "SPLAY" states may be favoured. As can be seen from FIGS. 4 and 5, in such "SPLAY" states the average through the cell of the component of polarisation normal to the plates 1, 3 is zero, and there will therefore be no net linear interaction between the liquid crystal and an electric field applied between the plates 1 and 3.

SUMMARY OF THE INVENTION

It is an object of the present invention to provide a liquid crystal device incorporating a ferroelectric liquid crystal wherein these problems may be overcome.

According to the present invention there is provided a liquid crystal device comprising a ferroelectric smectic phase liquid crystal enclosed between two plates, wherein the internal surfaces of the plates are such that the directors of the liquid crystal adjacent said internal surfaces are not parallel to the internal surfaces; wherein the directors adjacent one of the internal surfaces are not parallel to the directors adjacent the other of the internal surfaces; wherein the direction of the directors varies across the liquid crystal in the direction between the plates; wherein the spacing between the plates and the cone angle of the liquid crystal are such that an electric field applied between the plates causes switching of the liquid crystal uniquely between two different states the respective polarisations of which averaged across the liquid crystal are in different directions, said different directions not being parallel to either of the plates; and wherein the liquid crystal cone angle $\theta_s$ is substantially equal to half the angle $2\theta_o$ between a pair of directors each adjacent a different one of the internal surfaces.

Preferably the pitch of the liquid crystal helix is long at the lowest temperature of the cholesteric phase range.

Preferably the directors adjacent one of the internal surfaces make angles of $\theta_s$ with respect to said one surface, and the directors adjacent the other internal surface make angles of $2\theta_s$ with respect to the directors adjacent said one surface.

In one embodiment the liquid crystal suitably has the phase sequence ferroelectric smectic→cholesteric→isotropic in order of increasing temperature.

BRIEF DESCRIPTION OF THE DRAWINGS

Liquid crystal devices in accordance with the invention will now be described, by way of example only, with reference to FIGS. 6 to 12 of the accompanying drawings, in which.

DETAILED DESCRIPTION OF THE PREFERRED EMBODIMENTS

Figure 6:
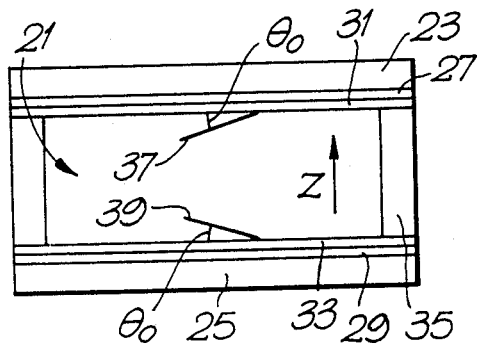
FIG. 6 is a schematic side view of a device in accordance with the invention.

Referring firstly to FIG. 6, the device comprises a quantity of a liquid crystal mixture known by the trade name "ZLI-3080" produced by Merck of Darmstadt, this material being of smectic C* phase at room temperature. The liquid crystal 21 is contained between two parallel glass plates 23 and 25, these plates having a nominal spacing of 2 μm. The inner surfaces of the plates 23, 25 carry respective transparent conductive coatings 27, 29 of indium tin oxide. Respective alignment layers 31, 33 of silicon monoxide are carried by the coatings 27, 29 on their surfaces remote from the plates 23, 25, these layers 31, 33 being produced by thermal evaporation at an angle of 5° to the plane of the plates 23, 25. Spacers 35 are used to separate the plates and to seal the device.

Figure 7:
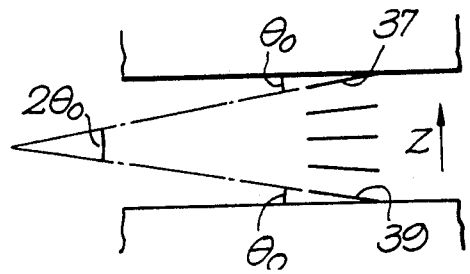
FIG. 7 illustrates the spread of director directions through the device.

The plates 23, 25 are oriented within the device such that the alignment layers 31, 33 cause the directors 37, 39 of the liquid crystal 21 adjacent the layers 31, 33 to be fixed at an angle $\theta_o$ to the plane of the plates 23, 25, the directors 37 adjacent the layer 31 not being parallel to the directors 39 adjacent the layer 33, the angle between the directors 37, 39 adjacent the different layers 31, 33 thus being $2\theta_o$. As the liquid crystal 21 has a pitch of 16.5 μm at 20° C., i.e. a pitch much greater than the spacing between the plates 23, 25, the directions of the directors will vary homogeneously across the liquid crystal in the direction between the two plates as shown in FIG. 7.

Figure 1:
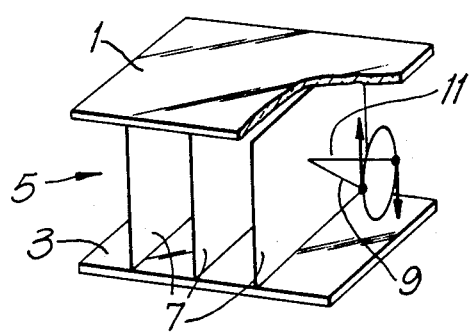
Figure 2:
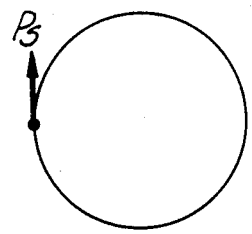
Figure 3:
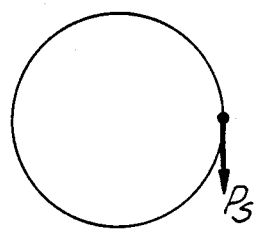
Figure 4:
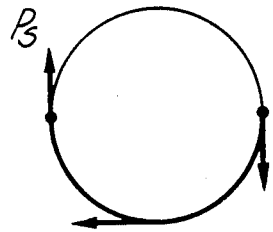
Figure 5:
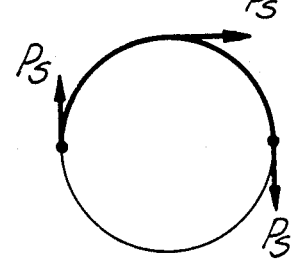
Figure 8:
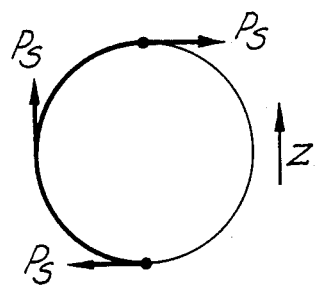
FIG. 8 illustrates a first polarisation state of the device.
Figure 9:
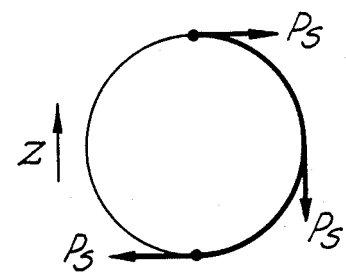
FIG. 9 illustrates a second polarisation state of the device.

Referring now also to FIGS. 8 and 9, if the liquid crystal cone angle $\theta_s$ is chosen to be half the angle $2\theta_o$ between pairs of directors, each director within a pair being adjacent to a different layer 31 or 33, two different equal energy states only will be possible in the liquid crystal 21. These states may be represented by the loci on a circle, equivalent to the base of the cone shown in FIGS. 1, 2 and 3, of the directors as a function of the co-ordinate z shown in FIG. 6 in the direction between the two plates 23, 25. The directions of the polarisation $P_s$ at the centre of the liquid crystal and adjacent the layers 31, 33 are also shown in FIGS. 8 and 9. As can be seen from these figures, the direction of polarisation adjacent the plates 23, 25 will be in the plane of the plates. Thus the problem inherent in the prior art arrangement of the surface coatings imparting a preference as to whether $P_s$ points towards or away from the containing plates is avoided.

In the state depicted in FIG. 8 the average polarisation across the crystal 21, which clearly will be less than $P_s$, is in the "Upward" direction, whilst in the state depicted in FIG. 9, the average polarisation is in the "Downward" direction. These two states may be called "UP-SPLAYED" and "DOWN-SPLAYED" states, respectively, to distinguish them from the "UP", "DOWN" and "SPLAY" states shown in FIGS. 2, 3, 4 and 5, which are present in prior art devices.

The liquid crystal 21 has the phase sequence

C5 SmC* 59.5 Ch 84.5 I where C represents the crystal phase, SmC* the smectic C* phase, Ch the cholesteric phase and I the isotropic phase, temperature being in degrees centigrade. Alignment of the liquid crystal 21 in its ferroelectric smectic C* phase is achieved by cooling the liquid crystal from its aligned cholesteric phase. If this cooling is performed in the absence of an applied electric field, the "UP-SPLAYED" and "DOWN-SPLAYED" states will simultaneously appear. If, however, the crystal 21 is cooled from the cholesteric into the ferroelectric smectic C* phase with a DC voltage of sufficient magnitude applied across the crystal by means of the conductive coatings 27, 29 only one of the "UP-SPLAYED" and "DOWN-SPLAYED" states will appear, which state appears being dependent on the polarity of the voltage.

When the crystal 21 is in its ferroelectric smectic C* phase, switching of the device may be achieved by application of DC voltage pulses across the coatings 27, 29. Since the "SPLAY" states which interfered with the bistability between the "UP" and "DOWN" states of the prior art displays at all but the smallest values of interplate spacing are not accessible, bistability of the device is available over a wider range of plate spacings. Furthermore, the required director alignment adjacent the alignment layers 31, 33 are of a conventional, known, type.

It will be appreciated that a device in accordance with the invention may be used in a variable birefringence mode. Whereas in prior art devices, such as that depicted in FIG. 1, the optic axis of the device is rotated in the plane through an angle equal to twice the liquid crystal cone angle when switching of the device occurs, in a device in accordance with the invention the optic axis varies in the direction normal to the confining plates, such that a maximum rotation of the optic axis on switching will occur at the centre of the cell, with a minimum rotation occurring adjacent the confining plates. The material cone angle will therefore usually be chosen to be larger than would be the case for such prior art devices for use of the device in a variable birefringence mode.

It will further be appreciated that alternatively a device in accordance with the invention may be used in the guest-host mode in which an anisotropic absorptive or fluorescent dye is dissolved in the liquid crystal.

Furthermore, whilst it is particularly advantageous that the cone angle $\theta_s$ is equal to half the angle $2\theta_o$ between a pair of directors, each director being adjacent a different one of the internal surfaces of the confining plates, if the cone angle is not precisely equal to $\theta_o$ one of the "UP-SPLAYED" or "DOWN-SPLAYED" states may be energetically favoured, and the other state will decay slowly back to the favoured state by a nucleated process after the switching electric field is removed. This proces may take several minutes, however, and may be acceptable in some applications.

Alternatively, if the cone angle $\theta_s$ is slightly greater than $\theta_o$ the device in one preferred embodiment is constructed with the directions of the projections of the surface directors 37, 39 onto the plates 23, 25 making an angle of substantially $2\theta_t$ with each other, where $\theta_t$ is given by $$\cos \theta_t = \cos \theta_s \sec \theta_o$$

Figure 10:
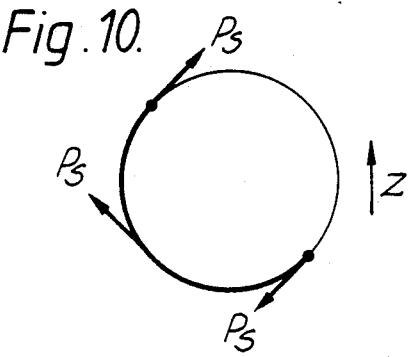
FIG. 10 illustrates a first polarisation state of another device in accordance with the invention.
Figure 11:
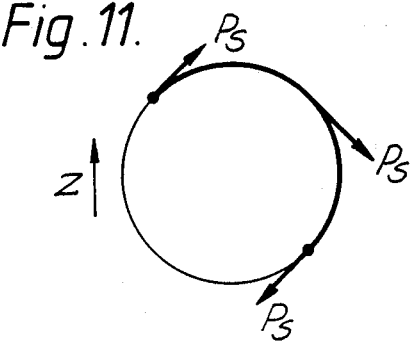
FIG. 11 illustrates a second polarisation state of the other device.

The "UP-SPLAYED" and "DOWN-SPLAYED" states shown in FIGS. 10 and 11, respectively, now have substantially equal energy and are thus bistable.

Further features of the invention may be understood by considering the curvature or flatness of the smectic layers 7. It will then be appreciated that a material with the phase sequence ferroelectric smectic→smectic A→cholesteric→isotropic may sometimes be used successfully in the device.

Figure 12:
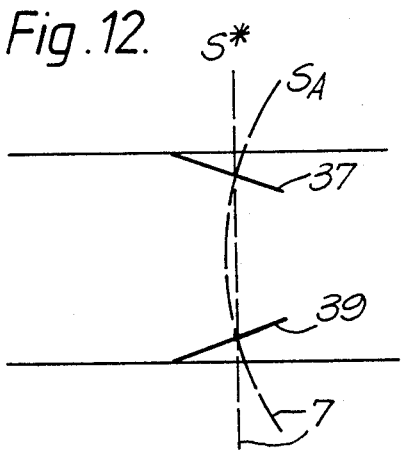
FIG. 12 is a schematic cross-section showing the form of the smectic layers.

FIG. 12 shows in cross-section the form of the smectic layers in both the $S_A$ phase (in which $\theta_s=0$) and the ferroelectric (S*) phase. Provided that the energy of distortion in the $S_A$ phase is not so good that the layers buckle into a "focal conic" configuration, good alignment according to the invention may be obtained even with the presence of a smectic A phase. An example of such a liquid crystal is "ZLI 3654" produced by Merck which has the phase sequence C-30 SmC* 62 SmA 76 Ch 86 I whereas an example of a liquid crystal in which the distortion energy in the smectic A phase is too high is the material known as "FCS 101" from Roche Products Ltd, which has the phase sequence C 0° S$_1$15.5 SmC* 55.4 SmA 76.1 N* 78.7 I.

It will also be appreciated that whilst a device in accordance with the invention is described with particular components, many variations on these will be apparent to those skilled in the art of liquid crystal devices, for example alternative plate materials, electrode materials, alignment layer materials and liquid crystals. It will particularly be appreciated that the liquid crystal phases may include the liquid phases C*, I*, F* or the solid phases J*, G*, K*, H*.

Furthermore, the required orientations of the directors may be achieved by other means than obliquely-evaporated dielectric layers. One example of alternative means for obtaining the required orientations is described in our co-pending U.K. Patent Application No. 8606358.

One advantage of a device in accordance with the invention is that bistability may be obtained in cells with an interplate spacing of at least 9 um. A second advantage is that the defects of alignment known as "zig-zags" are substantially or entirely absent from devices in accordance with the invention. This is because the configuration of the smectic layers is uniquely defined in the device, whereas in prior art devices states with more than one different layer configuration are possible, leading to the formation of large numbers of zig-zags.

We claim:

1. A liquid crystal device, comprising: a ferroelectric smectic phase liquid crystal enclosed between two plates, said plates having internal surfaces such that the directors of said liquid crystal adjacent said internal surfaces are not parallel to the internal surfaces; said directors adjacent one of said internal surfaces being not parallel to the directors adjacent the other of said internal surfaces;

said directors having a direction which varies across the liquid crystal in the direction between said plates; said plates having a spacing therebetween and the liquid crystal having a cone angle $\theta_s$ such that an electric field applied between said plates causes switching of said liquid crystal uniquely between two different states, the respective polarizations of which averaged across said liquid crystal are in different directions, said different directions not being parallel to either of said plates; and said liquid crystal cone angle $\theta_s$ being substantially equal to half the angle $2\theta_o$ between a pair of directors, each adjacent a different one of said internal surfaces.

2. A device according to claim 1, wherein said directors adjacent one of said internal surfaces makes angles $\theta_s$ with respect to said one surface, and said directors adjacent the other internal surface make angles of $2\theta_s$ with respect to said directors adjacent said one surface.

3. A device according to claim 1, wherein the liquid crystal has a phase sequence ferroelectric smectic→cholesteric→isotropic in order of increasing temperature.

4. A device according to claim 1, wherein an anisotropic dye is dissolved into the liquid crystal material.

5. A liquid crystal device, comprising: a ferroelectric smectic phase liquid crystal enclosed between two plates, said plates having internal surfaces such that the directors of said liquid crystal adjacent said internal surfaces are not parallel to the internal surfaces; said directors adjacent one of said internal surfaces being not parallel to the directors adjacent the other of said internal surfaces; said directors having a direction which varies across the liquid crystal in the direction between said plates; said plates having a spacing therebetween and said liquid crystal having a cone angle $\theta_s$ such that an electric field applied between said plates causes switching of said liquid crystal uniquely between two different states, the respective polarizations of which averaged across said liquid crystal are in different directions, said different directions not being parallel to either of said plates; said liquid crystal cone angle $\theta_s$ being substantially equal to half the angle $2\theta_o$ between a pair of directors, each adjacent a different one of said internal surfaces; said angle $\theta_o$ being not greater than $\theta_s$; and said directors having projections onto the internal surfaces of the directors adjacent said internal surfaces, said projections making an angle with each other substantially equal to $2\theta_t$, where $\cos \theta_t = \cos \theta_s \sec \theta_o$.

* * * * *